United States Patent [19]

Mahoney et al.

[11] Patent Number: 5,013,339

[45] Date of Patent: May 7, 1991

[54] COMPOSITIONS USEFUL FOR MAKING MICROPOROUS POLYVINYLIDENE FLUORIDE MEMBRANES, AND PROCESS

[75] Inventors: Robert D. Mahoney, Danville; Richard A. Lundgard, Antioch, both of Calif.

[73] Assignee: The Dow Chemical Company, Midland, Mich.

[21] Appl. No.: 446,027

[22] Filed: Dec. 5, 1989

[51] Int. Cl.$^5$ .................. B01D 53/22; B01D 71/34
[52] U.S. Cl. ........................... 55/158; 55/159; 210/500.23; 210/500.42; 264/41
[58] Field of Search ................... 521/64, 905; 210/500.23, 500.27, 500.42; 264/41; 55/158, 159

[56] References Cited

U.S. PATENT DOCUMENTS

| | | | |
|---|---|---|---|
| 4,203,848 | 5/1980 | Grandine, II | 210/500.42 X |
| 4,861,480 | 8/1989 | Berardo et al. | 210/500.42 X |
| 4,869,857 | 9/1989 | Itoh et al. | 210/500.42 X |
| 4,874,516 | 10/1989 | Kondo | 210/500.42 X |
| 4,943,373 | 7/1990 | Onishi et al. | 210/500.42 |

FOREIGN PATENT DOCUMENTS

| | | | |
|---|---|---|---|
| 0040670 | 12/1981 | European Pat. Off. | 210/500.42 |
| 0190558 | 8/1986 | European Pat. Off. | 210/500.42 |
| 0223709 | 5/1987 | European Pat. Off. | 210/500.42 |

*Primary Examiner*—Robert Spitzer
*Attorney, Agent, or Firm*—Janet Pauline Clark

[57] ABSTRACT

This invention relates a composition useful for preparing a polyvinylidene fluoride polymer membrane containing (1) a polyvinylidene fluoride polymer, (2) glycerol monoacetate, glycerol diacetate, glycerol triacetate, or mixtures thereof, and (3) optionally glycerol, wherein the polyvinylidene fluoride polymer membrane prepared from the composition is useful for a membrane liquid separation process such as microfiltration, ultrafiltration, dialysis, or membrane stripping. In another aspect, this invention is an improved process for using the composition to prepare a polyvinylidene fluoride polymer membrane by forming a mixture of the composition, heating the mixture to a temperature at which the mixture becomes a homogeneous fluid, and extruding, molding, or casting the homogeneous fluid into a membrane. Another aspect of this invention relates to a polyvinylidene fluoride polymer membrane where the fabricated membrane contains glycerol monoacetate, glycerol diacetate, glycerol triacetate, or mixtures thereof, and optionally glycerol.

28 Claims, No Drawings

COMPOSITIONS USEFUL FOR MAKING MICROPOROUS POLYVINYLIDENE FLUORIDE MEMBRANES, AND PROCESS

BACKGROUND OF THE INVENTION

This invention relates to a novel composition to be used in preparing microporous polyvinylidene fluoride polymer membranes useful for liquid separations and other purposes. This invention further relates to a process utilizing the composition to prepare a microporous polyvinylidene fluoride membrane. This invention still further relates to a microporous polyvinylidene fluoride polymer membrane useful for liquid separations, for liquid-gas interchanges, and other uses.

Polyvinylidene fluoride type polymer membranes have long been used in membrane separation processes such as microfiltration, ultrafiltration, dialysis, membrane distillation, membrane stripping and the like. Membranes made from polyvinylidene fluoride polymers have good solvent resistance, are easily processed, and are low in cost. Typically, polyvinylidene fluoride polymer membranes are prepared by extruding, molding, or casting the membranes from blends containing a polymer, a solvent, and an optional non-solvent. Solvents are compounds in which the polymer substantially dissolves at the membrane fabrication temperature. Non-solvents are compounds in which the polymer is substantially insoluble at the membrane fabrication temperature. Solvents which have been used to prepare polyvinylidene fluoride polymer membranes include dimethylformamide, dimethyl acetamide, N-methyl-2-pyrrolidinone, and dimethyl sulfoxide. Non-solvents which have been used to prepare polyvinylidene fluoride polymer membranes include ethylene glycol, propylene glycol, methanol, propanol, water, and maleic acid. Generally, residual amounts of such solvents and non-solvents cannot be left in the membranes because they cause unacceptable contamination of the fluids being treated. Avoiding such contamination is particularly important in the treatment of biological fluids, such as blood or water. The solvents and non-solvents are therefore typically completely removed during membrane fabrication by extensive leaching. Once the solvents and non-solvents are removed from the membranes, they present problems of disposal or extensive repurification before reuse.

THE PRIOR ART

Various processes are known in the art for making membranes from vinylidene fluoride polymers. For example, U.S. Pat. No. 4,384,047 discloses vinylidene fluoride polymer ultrafiltration membranes which are prepared by casting a sheet of the polymer dissolved in a mixture of a specified solvent and a specified non-solvent, on a smooth substrate, evaporating a portion of the solvent from the sheet, immersing the sheet in a gelation liquid and optionally stabilizing the gelled sheet by heat treatment. The advantage claimed for this process is that a porous vinylidene fluoride polymer membrane having smooth, unwrinkled surfaces can be prepared. Suitable solvents include triethylphosphate, hexamethylphosphoramide, 1-methyl-2-pyrrolidone, dimethylacetamide, and the like.

U.S. Pat. No. 4,613,441 discloses a porous membrane formed of, among other resins, polyvinylidene fluoride.

U.S. Pat. No. 4,615,943 discloses a transparent film of a vinylidene fluoride copolymer made by dissolving the polymer in a suitable solvent, then casting the polymer onto a substrate, and evaporating off the solvent. Examples of solvents stated to be suitable for use in conjunction with vinylidene fluoride copolymers include polar organic solvents such as dimethylacetamide, dimethylformamide, methylethylketone, dimethylsulfoxide, cyclohexanone, acetone, and the like.

U.S. Pat. No. 4,629,563 discloses an improved ultraporous and microporous membrane having a reticulated structure free of large finger voids. In one example, the membrane is made by dissolving polyvinylidene fluoride and the non-solvent glycerine in dimethylformamide. Other solvents indicated to be suitable for use include dimethylacetamide, dioxane, N-methyl-2-pyrrolidinone, dimethylsulfoxide, chloroform, tetramethylurea, and tetrachloroethane.

The prior art membrane preparation processes are complex, time consuming, and expensive because they require complete removal of the processing solvents and non-solvents prior to use.

What is needed are extrusion, molding, or casting compositions for polyvinylidene fluoride polymers in which the solvents and non-solvents are not harmful or deleterious or which can be converted into substances which are not harmful or deleterious in membranes made therefrom. Accordingly, such solvents and non-solvents would not have to be leached from the membranes prior to use.

SUMMARY OF THE INVENTION

This invention, in one aspect, is a novel composition useful for preparing a microporous polyvinylidene fluoride polymer membrane comprising a mixture of:
1. at least one polyvinylidene fluoride polymer,
2. at least one solvent selected from the group consisting essentially of glycerol monoacetate, glycerol diacetate, glycerol triacetate, and mixtures thereof, in an amount itself sufficient to solubilize the polyvinylidene fluoride polymer at the membrane formation temperature, and
3. optionally, the non-solvent glycerol, wherein the polyvinylidene fluoride polymer, solvent, and optional non-solvent are present in a ratio useful to form a microporous membrane suitable for use in a liquid separation process, and other uses.

In another aspect, this invention is a process for preparing a microporous polyvinylidene fluoride polymer membrane from the aforementioned composition comprising:
1. forming a mixture comprising:
    a. at least one polyvinylidene fluoride polymer,
    b. at least one solvent selected from the group consisting essentially of glycerol monoacetate, glycerol diacetate, glycerol triacetate, and mixtures thereof, in an amount itself sufficient to solubilize the polyvinylidene fluoride polymer at the membrane formation temperature, and
    c. optionally, the non-solvent glycerol;
2. heating the mixture to a temperature at which the mixture becomes a homogeneous fluid;
3. extruding, molding, or casting the homogeneous fluid into a microporous membrane; and
4. passing the membrane through one or more quench zones wherein the membrane gels and solidifies;

wherein the microporous membrane so formed is useful for a membrane liquid separation process, and other uses.

Another aspect of the invention is a microporous polyvinylidene fluoride polymer membrane useful for liquid separations comprising a polyvinylidene fluoride polymer membrane containing at least one compound selected from the group consisting essentially of glycerol monoacetate, glycerol diacetate, glycerol triacetate, and mixtures thereof, and optionally glycerol.

Because the solvents (glycerol monoacetate, glycerol diacetate, glycerol triacetate, and mixtures thereof) and non-solvent (glycerol) included in the composition from which the membrane is prepared are or can be converted into substances the presence of which are compatible with and/or accepted in the end use of the membrane, the membrane does not require extensive leaching prior to use.

Yet another aspect of this invention is a water impervious, air breathable material comprising a film of polyvinyl fluoride polymer made in accordance with the process of this invention. This film may be bonded to an air permeable fabric substrate.

In one preferred embodiment, the process of the invention can be used to make hollow fibers. This process comprises:

A. mixing at least one polyvinylidene fluoride polymer with at least one solvent selected from the group consisting essentially of glycerol monoacetate, glycerol diacetate, glycerol triacetate, and mixtures thereof, in an amount itself sufficient to solubilize the polyvinylidene fluoride polymer at the membrane formation temperature and optionally the non-solvent glycerol;

B. heating the mixture to a temperature at which the mixture forms a homogeneous fluid and possesses sufficient viscosity at extrusion conditions to permit extrusion of a hollow fiber membrane;

C. extruding the mixture into a hollow fiber membrane using a core fluid;

D. passing the hollow fiber membrane through at least one gaseous quench zone under conditions such that the mixture cools and begins to phase separate while minimizing the loss of solvent and optional non-solvent from the external surface of the hollow fiber membrane;

E. passing the hollow fiber membrane through at least one liquid quench zone comprising a liquid in which the polyvinylidene fluoride polymer possesses low solubility, wherein at least a portion of the solvent(s) and optional non-solvent is removed from the hollow fiber membrane;

F. optionally, simultaneously or consecutively passing the hollow fiber membrane through at least one liquid leach zone comprising a liquid in which the polyvinylidene fluoride polymer possesses low solubility, wherein a substantial portion of the remaining solvent(s) and optional non-solvent is removed from the hollow fiber membrane;

G. optionally, drawing the membrane before, during, and/or after leaching at a temperature at or above ambient temperature and below the melting point of the polyvinylidene fluoride polymer or the depressed melting point of the mixture to elongate the membrane and to induce orientation of the polyvinylidene fluoride polymer in the membrane; and H. optionally, drying the hollow fibers, thereby forming hollow fibers having pore sizes suitable for microfiltration or ultrafiltration when the solvent is removed therefrom.

The process of this invention may have other embodiments, depending upon the ultimate end product desired.

For example, if a sheet membrane is desired, then the process comprises:

A. mixing at least one polyvinylidene fluoride polymer with at least one solvent selected from the group consisting essentially of glycerol monoacetate, glycerol diacetate, glycerol triacetate, and mixtures thereof, in an amount itself sufficient to solubilize the polyvinylidene fluoride polymer at the membrane formation temperature and optionally the non-solvent glycerol;

B. heating the mixture to a temperature at which the mixture forms a homogeneous fluid and possesses sufficient viscosity to permit extruding, molding, or casting the homogeneous fluid into a sheet membrane;

C. extruding, casting, or molding the mixture into a sheet membrane;

D. passing the sheet membrane through at least one gaseous quench zone under conditions such that the mixture cools and begins to phase separate while minimizing the loss of solvent(s) and optional non-solvent from the external surfaces of the membrane sheet;

E. passing the sheet membrane through at least one liquid quench zone comprising a liquid in which the polyvinylidene fluoride polymer possesses low solubility, wherein at least a portion of the solvent(s) and optional non-solvent is removed from the sheet membrane;

F. optionally, simultaneously or consecutively passing the sheet membrane through at least one liquid leach zone comprising a liquid in which the polyvinylidene fluoride polymer possesses low solubility, wherein a substantial portion of the remaining solvent(s) and optional non-solvent is removed from the sheet membrane;

G. optionally, drawing the membrane before, during, and/or after leaching at a temperature at or above ambient temperature and below the melting point of the polyvinylidene fluoride polymer or the depressed melting point of the mixture to elongate the membrane and to induce orientation of the polyvinylidene fluoride polymer in the membrane; and H. optionally, drying the sheet, thereby forming a sheet membrane having pore sizes suitable for microfiltration or ultrafiltration when the solvent is removed therefrom.

DETAILED DESCRIPTION OF THE INVENTION

This invention consists of compositions useful for forming polyvinylidene fluoride polymer membranes comprising at least one polyvinylidene fluoride polymer, at least one solvent selected from the group consisting essentially of glycerol monoacetate, glycerol diacetate, glycerol triacetate, and mixtures thereof, in an amount itself sufficient to solubilize the polyvinylidene fluoride polymer at the membrane formation temperature, and optionally the non-solvent glycerol; wherein the polyvinylidene fluoride polymer, solvent, and optional non-solvent are present in a ratio useful to form a microporous membrane useful for liquid separation process or as a microporous support for a composite gas or liquid separation membrane.

The term "polyvinylidene fluoride polymer" is used herein to include vinylidene fluoride homopolymers; random and block copolymers of vinylidene fluoride such as vinylidene fluoride-tetrafluoroethylene copolymers, vinylidene fluoride-propylene hexafluoride copolymers, vinylidene fluoride-ethylene copolymers, vinylidene fluoride-chlorotrifluoro-ethylene copolymers, and terpolymers and mixtures thereof. The term "polyvinylidene fluoride polymer" further includes physical blends of polymers of the above-mentioned polyvinylidene fluoride polymers, optionally with a small quantity of other polymers such as polysulfone, polyethersulfone, polycarbonate, 6-nylon, 6,6-nylon, cellulose triacetate, cellulose diacetate, polyurethane, polyvinylchloride, polyvinylidene chloride, other vinyl polymers, polyamide or polyimide. The vinylidene fluoride polymer content of said physical blends of polymers is preferably about 70 percent or more by weight, more preferably about 80 percent or more by weight, even more preferably about 90 percent or more by weight.

The preferred polymer for use in the compositions and process of the invention is polyvinylidene fluoride, however, mixtures of polyvinylidene fluoride and co-polymers thereof can also be used as previously described.

Polyvinylidene fluoride polymers are fluorine compounds having the chemical structure of $-CF_2-CH_2m$ (wherein m is a positive integer) and having an average fluoride content of 50 to 60 percent in one repeat unit. Preferred for use in this invention are polymers with a high crystallinity in which methylene groups and methylene difluoride groups are bonded alternately.

Preferred polyvinylidene fluoride polymers for use in the process of this invention are those polymers having an average molecular weight of about $1.5 \times 10^5$ or greater.

Surprisingly, it has been found that the polyvinylidene fluoride polymer and co-polymers will dissolve easily in the water soluble glycerol acetate compounds. There are several advantages to this. One is that it is much cheaper, and environmentally desirable to use a water soluble solvent, because the water soluble solvent can be leached out, if desired, in a subsequent processing step and disposed of with a minimum of environmental problems.

Secondly, and perhaps of equal importance, it is sometimes desirable to produce a so-called "wet" membrane by filling the pores of the membrane with a substance which prevents pore collapse when the membrane is dried or to enable the pores of a hydrophobic membrane to be wet by water without the application of high pressures. Glycerol acetates perform this function very well.

Preferred solvents useful in this invention are glycerol monoacetate (monoacetin), glycerol diacetate (diacetin), glycerol triacetate (triacetin), and mixtures thereof. More preferred solvents are glycerol monoacetate, glycerol diacetate, and mixtures thereof. Commercially available monacetin and diacetin, such as sold under the Hallco tradename by C.P. Hall, comprise mixtures of glycerol acetates and glycerol. The solvents useful in this invention may optionally contain small amounts of other compounds which are not deleterious to the membrane or unacceptable in its applications. Preferably, the presence of these minor impurities other then glycerol in the solvent is less than about 15 weight percent, more preferably less than about 5 weight percent.

The optional non-solvent preferred in this invention is glycerol.

The concentrations of the components in the extrusion, molding, or casting composition may vary. Miscibility of the composition at the extrusion, molding, or casting temperature is one factor to be considered in forming the extrusion, molding, or casting composition. Miscibility of polymer solutions may be readily determined empirically by methods known in the art. The amount of glycerol acetate, glycerol diacetate, or glycerol triacetate solvent used in the composition is advantageously sufficient to itself solubilize the polyvinylidene fluoride polymer at the extrusion, molding, or casting temperature; that is, no other solvent other than the glycerol acetates is necessary to solubilize the polyvinylidene fluoride polymer. The end use of the membrane is another factor in determining the appropriate blend composition, because the preferred pore size and transport rate through the membrane vary dependent upon the intended membrane end use.

For forming the membranes of this invention, the concentration of polyvinylidene fluoride polymer in the mixture is preferably at least about 10 weight percent, more preferably at least about 15 weight percent, even more preferably at least about 20 weight percent; the concentration of polyvinylidene fluoride polymer is preferably less than about 90 weight percent, more preferably less than about 80 weight percent, even more preferably less than about 70 weight percent. The concentration of the solvent (glycerol monoacetate, glycerol diacetate, glycerol triacetate, mixtures thereof) is preferably at least about 20 weight percent, more preferably at least about 40 weight percent; the concentration of solvent is preferably less than about 90 weight percent, more preferably less than about 85 weight percent. The concentration of the optional non-solvent (glycerol) is preferably from about 0 to about 80 weight percent, more preferably from about 5 to about 60 weight percent.

The compositions of this invention may be used to fabricate membranes useful for membrane liquid separation processes such as microfiltration, ultrafiltration, dialysis, membrane distillation, and membrane stripping. Such membranes may be fabricated by several alternative process schemes. In one preferred process, the polyvinylidene fluoride polymer, solvent, and optional non-solvent mixture is extruded, molded, or cast, then air quenched. In another preferred process, the polyvinylidene fluoride polymer, solvent, and optional non-solvent mixture is extruded, molded, or cast, quenched, leached, and optionally dried. In another preferred process, the mixture is extruded, molded or cast, quenched, leached, replasticized, then optionally dried. The choice of a membrane fabrication process is in part determined by the membrane properties desired.

The membranes are first extruded, molded, or cast from the polyvinylidene fluoride polymer, solvent, and optional non-solvent mixtures hereinbefore described. In the case of casting, a relatively homogeneous mixture is prepared which possesses a suitable viscosity for casting at a given temperature. For casting, the viscosity of the mixture is preferably from about 2 to about 25 poise. The casting mixture may be cast at room temperature or at elevated temperatures depending upon the viscosity of the mixture. The mixture is preferably cast at a temperature of from about 25° to about 200° C. The mixture may be cast by pouring the mixture onto a smooth support surface and drawing down the mixture to an appropriate thickness with a suitable tool such as a doctor blade or casting bar. Alternately, the mixture may be cast in a continuous process by casting the mixture onto endless belts or rotating drums. The casting surface is such that the finished membrane may thereafter be readily separated from the surface. For example, the membrane may be cast onto a support having a low surface energy, such as silicone, coated glass, or metal, or a surface to which the membrane will not adhere. The mixture may also be cast onto the surface of a liquid with which the polymer is immiscible, such as water or mercury. Alternately, the mixture may be cast onto a support surface, such as a non-woven web, which may thereafter be dissolved away from the finished membrane. The membrane may also be cast onto a permanent support surface which does not substantially impede transport through the membrane. The membranes are then processed in a manner similar to that described hereinafter for extruded membranes.

In the case of extrusion, the components of the extrusion mixture may be combined prior to extrusion by mixing in any convenient manner with conventional mixing equipment, as for example in a Hobart mixer. Alternatively, the extrusion mixture may be homogenized by extruding the mixture through a twin screw extruder, cooling the extrudate, and grinding or pelletizing the extrudate to a particle size readily fed to a single or twin screw extruder. The components of the extrusion mixture may also be combined directly in a melt-pot or twin screw extruder and extruded into membranes in a single step.

The viscosity of the polyvinylidene fluoride polymer, solvent, and optional non-solvent mixture must not be so high that the mixture is too viscous to extrude at temperatures which do not deleteriously affect the polymer; on the other hand, the viscosity must not be so low that the mixture does not maintain its desired shape upon exiting the extrusion die. The membrane may retain its desired shape upon extrusion by cooling or by coagulation.

The mixture is heated to a temperature which results in a homogeneous mixture possessing a viscosity suitable for extrusion. The temperature should not be so high as to cause significant degradation of the polyvinylidene fluoride polymer. The temperature should not be so low as to render the mixture too viscous to extrude. The extrusion temperature is preferably at least about 20° C., more preferably at least about 25° C.; the extrusion temperature is preferably less than about 250° C., more preferably less than about 220° C.

The mixture of polyvinylidene fluoride polymer, solvent, and optional non-solvent is extruded through a sheet, hollow tube, or hollow fiber die (spinnerette). Hollow fiber spinnerettes typically are multi-holed and thus produce a tow of multiple hollow fibers. The hollow fiber spinnerettes include a means for supplying fluid to the core of the extrudate. The core fluid is used to prevent the collapsing of the hollow fibers as they exit the spinnerette. The core fluid may be a gas such as nitrogen, air, carbon dioxide, or other inert gas or a liquid which is a non-solvent for the polyvinylidene fluoride polymer such as water, ethylene glycol or glycerol, or a mixture of solvent and non-solvent. The temperature and composition of the core fluid can affect the properties and structure of the membrane.

The extrudate exiting the die enters one or more quench or coagulation zones. The environment of the quench or coagulation zone may be gaseous or liquid or a combination thereof. Within the quench or coagulation zone, the extrudate is subjected to cooling and/or coagulation to cause gelation and solidification of the membrane. In a preferred embodiment, the membranes are quenched in air. Within the quench zone, the membranes gel and solidify. The temperature of the air zone is preferably at least about 10° C., more preferably at least about 20° C.; the temperature of the air zone is preferably less than about 100° C., more preferably less than about 80° C. The residence time in the air zone is preferably less than about 180 seconds, more preferably less than about 30 seconds, even more preferably less than about 10 seconds. Shrouds may be used to help control air flow rates and temperatures in the air quench zone.

Subsequent to or instead of the air quench, the membranes may optionally be quenched or coagulated in a liquid which is substantially a non-solvent for the polyvinylidene fluoride polymer, such as water, or a mixture of water and the glycerol acetate solvents, and/or the optional non-solvent glycerol. Some removal of the solvent and/or optional non-solvent from the membrane may occur in the liquid quench or coagulation zone. The temperature of the liquid quench or coagulation zone is preferably at least about 0° C., more preferably at least about 2° C.; the temperature of the liquid quench or coagulation zone is preferably less than about 160° C., more preferably less than about 130° C., even more preferably less than about 110° C. The residence time in the liquid quench or coagulation zone at the liquid quench temperature should be sufficient to gel and solidify the membranes. The residence time in the quench or coagulation liquid is preferably less than about 60 seconds, more preferably less than about 30 seconds. As the membrane extruded from the polymer/solvent/optional non-solvent mixture cools, phase separation of the polymer and the solvent and optional non-solvent occurs. This is because the polymer is insoluble in the solvent at lower temperatures, i.e., the temperature to which the nascent membrane is cooled. Phase separation results in discrete regions of solvent and optional non-solvent being formed in the membrane. These regions, when ultimately leached out, form the pores for the microporous membrane of the invention.

Whether or not a given membrane is quenched and/or coagulated will depend to a certain extent upon the ultimate end use of the membrane.

As used herein the term "microporous" refers to a membrane which is generally non-selective to gases, but selective to dissolved or suspended particles in liquids.

Microporous membranes may be isotropic (symmetric) or anisotropic (asymmetric). Isotropic microporous membranes possess a morphology in which the pore size within the membrane is substantially uniform throughout the membrane. Anisotropic (asymmetric) microporous membranes possess a morphology in which a pore size gradient exists across the membrane; that is, the membrane morphology varies from highly porous, larger pores at one membrane surface to less porous, smaller pores at the other membrane surface. Such anisotropic membranes thus posses a microporous "skin" of smaller pores. The term asymmetric is often used interchangeably with the term anisotropic and the term symmetric is often used interchangeably with the term isotropic.

Coagulation is normally used in conjunction with the manufacture of anisotropic membranes. By immersing the newly extruded membranes in a fluid which is a non-solvent for the polyvinylidene fluoride polymer in the membrane, but a solvent for the solvent and optional non-solvent forming the original mixture of polymer, solvent and optional non-solvent, membranes with anisotropic characteristics can be formed.

Membranes in the form of fibers or films are optionally drawn down using godet rollers or other conventional equipment to the appropriate size. Line speeds are not generally critical and may vary over a wide range. Minimum preferred line speeds for reasons of economy in operation are at least about 10 feet per minute, more preferably at least about 100 feet per minute. Maximum preferred line speeds for ease in handling are less than about 1000 feet per minute, more preferably less than about 500 feet per minute.

The desired thickness for the membrane will depend upon its intended end use and other factors. In the embodiment wherein the membrane is useful for ultrafiltration or microfiltration, film membranes are preferably from about 10 microns to about 500 microns in thickness. Hollow fiber membranes for ultrafiltration or microfiltration preferably possess an outside diameter from about 100 microns to about 5000 microns, more preferably from about 300 microns to about 3000 microns; with a wall thickness of preferably from about 10 microns to about 500 microns, more preferably from about 15 microns to about 200 microns. In the embodiment wherein the membrane is useful for dialysis, film membranes are preferably from about 10 microns to about 75 microns in thickness. Hollow fiber membranes for dialysis preferably possess an outside diameter of from about 100 microns to about 500 microns, more preferably from about 175 microns to about 300 microns; with a wall thickness of preferably from about 5 to about 50 microns, more preferably about 10 to about 30 microns.

One of the major advantages of the process of this invention is that there is no requirement that the membrane produced by any one of the steps of extruding, molding, or casting of the homogeneous mixture be leached of the solvent and optional non-solvent any time prior to the ultimate end use thereof. This is because the glycerol acetates, i.e., glycerol monoacetate, glycerol diacetate, glycerol triacetate, or mixtures thereof, and glycerol are non-toxic in the end product when the products are used for biological fluid separation. Because of this, one of the steps normally undertaken during the process of manufacturing such membranes may be omitted, i.e., the solvent and optional non-solvent leaching step. This is of substantial benefit in as much as considerable cost savings are realized by omission thereof.

While the greatest advantage of the process of this invention is to eliminate the need for leaching, there may however, be some occasions where leaching may be advantageous. Those occasions may arise when it is desired, for a variety of reasons, to change or replace the solvent and/or optional non-solvent in the membrane. Thus in some instances, it may be desirable to replace a portion or all of the glycerol acetate with glycerol. In that event, following quenching and/or coagulation, the membranes may be passed through at least one leach zone containing a liquid which is substantially a non-solvent for the polyvinylidene fluoride polymer such as water, or a mixture of water and the glycerol acetate solvents, and/or the optional non-solvent glycerol to remove at least a portion of the solvent and optional non-solvent. The leach bath need not remove all of the solvent and optional non-solvent from the membrane, although this can be done if desired. The leach bath preferably contains up to about 75 weight percent glycerol in water, more preferably up to about 50 weight percent glycerol in water. The minimum temperature of the leach bath is such that removal of the solvent and optional non-solvent from the membrane occurs at a reasonable rate. The minimum temperature of the leach bath is preferably at least about $-10°$ C., more preferably at least about 0° C., even more preferably at least about 10° C. The maximum temperature of the leach bath is below that temperature at which membrane integrity is deleteriously affected. The temperature of the leach bath is preferably less than about 100° C., more preferably less than about 90° C. The residence time in the leach bath is preferably less than about 1000 seconds, more preferably less than about 400 seconds. The membranes may be drawn down to the desired size prior to entrance into the leach bath, during the residence time in the leach bath, subsequent to exiting the leach bath, or a combination thereof.

Following leaching, and optional drawing and replasticization, the membranes are optionally dried. The membranes may be dried in air or an inert gas such as nitrogen. The air or inert gas used to dry the membrane should have a low enough initial water content so that drying of the membrane takes place at reasonable rates. Room air is a suitable and convenient source for drying the membrane. The membranes may be dried at temperatures at which drying takes place at a reasonable rate and which do not adversely affect the membrane. The drying temperature is preferably at least about 10° C., more preferably at least 20° C. The drying temperature is preferably less than about 120° C., more preferably less than about 90° C. The drying time is preferably at least about 30 seconds, more preferably at least about 60 seconds. The membranes may be dried under reduced pressures.

Optionally, before or after leaching and/or drawing, the membranes may be annealed by exposing the membranes to elevated temperatures. The membranes may be annealed at temperatures above the glass transition temperature (Tg) of the polyvinylidene fluoride polymer or polyvinylidene fluoride polymer/solvent/optional non-solvent mixture and about 10° C. below the melting point of the polyvinylidene fluoride polymer or depressed melting point of the polyvinylidene fluoride polymer/solvent/optional non-solvent mixture for a period of time between about 30 seconds and about 24 hours.

The membranes formed by the hereinbefore described processes may in fact contain significant amounts of solvent and optional non-solvent, depending on the quench and/or coagulation, and leach, if any, conditions used. The membranes may contain up to about 75 percent solvent and optional non-solvent following fabrication. For some applications, such membranes containing significant levels of solvent and optional non-solvent may be stored for long periods of time without adverse impact on membrane separation properties.

The membranes are fabricated into flat sheet, spiral, tubular, or hollow fiber devices by methods described in the art. Spiral wound, tubular, and hollow fiber devices are preferred. Tubesheets may be affixed to the membranes by techniques known in the art. The membrane is sealingly mounted in a pressure vessel in such a manner that the membrane separates the vessel into two fluid regions wherein fluid flow between the two regions is accomplished by fluid permeating through the membrane. Conventional membrane devices and fabrication procedures are well known in the art.

The membranes formed by the described processes may be used in membrane liquid separation processes such as microfiltration, ultrafiltration, membrane distillation, dialysis, and membrane stripping. The membrane device fabrication process is generally performed so as to tailor the resulting membrane device for its specific end use. Such adaptation is readily achieved by one skilled in the art.

Ultrafiltration and microfiltration are pressure driven filtration processes using porous membranes in which particles or solutes are separated from solutions. Separation is achieved on the basis of differences in particle size or molecular weight. Such membranes may be characterized by the hydraulic permeability and the sieving coefficient. The hydraulic permeability is a measure of the volume of solvent transported through the membrane under the influence of a pressure gradient. The hydraulic permeability, $P_h$, is expressed at a specified temperature.

$$P_h = \frac{\text{(amount of solvent permeated)}}{\text{(membrane area) } (\Delta P \text{ across membrane) (time)}}$$

where $\Delta P$ is the pressure differential across the membrane. The hydraulic permeability is commonly expressed in units of $$\frac{\text{milliliters}}{(\text{meter})^2 \text{ (hour) (centimeters Hg)}}$$

or as gallons/square foot/day (GFD) at a given pressure.

The ultrafiltration and microfiltration membranes of this invention preferably have an hydraulic permeability for water at 25° C. of at least about $$10 \frac{\text{milliliters}}{(\text{meter})^2 \text{ (hour) (centimeters Hg)}}.$$

The sieving coefficient is designated $\Phi$.

$$\Phi = C_f/C_s$$

where $C_f$ is the concentration of a small volume of filtrate at a given moment and $C_s$ is the simultaneous concentration of the solution being filtered.

Ultrafiltration and microfiltration membranes may also be characterized by their porosity and pore size. Porosity refers to the volumetric void volume of the membrane. Membranes of this invention useful for ultrafiltration and microfiltration preferably have a porosity of between about 10 and about 90 percent, more preferably between about 15 and about 80 percent, even more preferably between about 20 and about 70 percent. Pore size may be estimated by several techniques, including scanning electron microscopy and/or measurements of bubble point, solvent flux, and molecular weight cutoff. Such techniques are well known in the art for characterizing the pore size of microporous membranes, see Robert Kesting, *Synthetic Polymeric Membranes*, 2nd edition, John Wiley & Sons, New York, 1985, pp. 46–56; Channing R. Robertson (Stanford University), *Molecular and Macromolecular Sieving by Asymmetric Ultrafiltration Membranes*, OWRT Report, NTIS No. PB85-1577661EAR, September 1984; and ASTM Test Method F316-86, the relevant portions of which are incorporated herein by reference. The average pore sizes of the membranes of this invention useful for ultrafiltration are preferably from about 20 Angstroms to about 500 Angstroms. The average pore sizes of the microfiltration membranes of this invention are preferably from about 0.05 microns to about 10 microns. The rejection of various solutes may be tested by successively feeding a solution containing a solute to one side of the ultrafiltration or microfiltration membrane of a given temperature and pressure and analyzing the permeate collected from the other side of the membrane to determine the extent of solute rejection. The percent rejection is calculated using the equation $100 \times [1-(C_f/C_s)]$ where $C_f$ is the concentration of the solute in the permeate and $C_s$ is the concentration of the solute in the feed. A series of different solutes with different nominal molecular weights may be used such as Blue Dextran 2,000,000, Apoferritin Ferritin 490,000, Albumin 69,000, Cytochrome C 12,400, Vitamin B-12 1335 and Methylene Blue Chloride 374. Ultrafiltration membranes of this invention preferably possess molecular cut-offs of between about 500 and about 300,000.

Dialysis is a process whereby solute molecules are exchanged between two liquids by diffusion through a microporous membrane under the influence of a concentration gradient across the membrane separating the two liquids. The ability of a membrane to perform a dialysis separation may be characterized by the overall diffusive mass transfer coefficient, $K_{OV}$, for the solute of interest. In particular, membranes useful for the dialysis of blood may be characterized by the overall diffusive mass transfer coefficient for urea, $K_{OV}(\text{urea})$.

$K_{OV}(\text{urea})$ is commonly expressed in units of centimeters/minute. Membranes of this invention useful for blood dialysis preferably possess an overall diffusive mass transfer coefficient for urea at 37° C. of at least about $20 \times 10^{-3}$ centimeters/minute. Membranes of this invention useful for dialysis preferably have an hydraulic permeability for the removal of water from blood at 37° C. of at least about $$10 \frac{\text{milliliters}}{(\text{meter})^2 \text{ (hour) cm Hg}}.$$

In membrane distillation or membrane stripping, the membranes are used to remove or recover more volatile components from solutions containing more volatile components and less volatile components. For example, membrane distillation and membrane stripping are useful for removing volatile organics from aqueous streams. The membrane divides the separation chamber into two regions. The feed stream containing more volatile and less volatile components is contacted with the non-permeate side of the membrane, while contacting the permeate side of the membrane with a sweep gas such as nitrogen, carbon dioxide, air, or other inert gas, a vacuum, or a combination thereof, under conditions such that the more volatile components permeate through the membrane as a vapor. A chemical potential gradient is thus established across the membrane due to the difference in vapor pressure of the more volatile components across the membrane. When a sweep gas is used, in some embodiments it may be advantageous to maintain the pressure on the permeate side of the membrane at a pressure greater than the pressure on the non-permeate side of the membrane in order to prevent leakage of liquid from the non-permeate side of the membrane through pores in the membrane to the permeate side of the membrane. In membrane stripping, the more volatile components which permeate through the membrane as vapor are removed from the permeate side of the membrane as vapor; in membrane distillation, the more volatile components which permeate through the membrane as vapor are condensed on the permeate side of the membrane and removed as liquid.

The separation processes described hereinbefore should be carried out at pressures which do not adversely affect the membrane, that is, pressures which do not cause the membrane to mechanically fail. The pressure differential across the membrane is dependent upon the membrane characteristics, including pore size, porosity, the thickness of the membrane, and in the case of hollow fiber membranes, the inside and outside diameters. For the membranes of this invention, the pressure differential across the membrane is preferably between about 5 and about 500 psig, more preferably between about 10 and about 300 psig. The separation processes described hereinbefore should be carried out at temperatures which do not adversely affect membrane integrity. Under continuous operation, the operating temperature is preferably between about 0° and about 150° C., more preferably between about 15° and about 130° C.

Films cast from polyvinylidene fluoride polymers in accordance with the process of the invention are also suitable for use in making air breathable waterproof materials. Such materials comprise an air permeable substrate, normally woven cotton or a synthetic fiber, to which is bonded a polyvinylidene fluoride polymer film, which has had the solvent and/or optional non-solvent leached therefrom after the film is cast. After casting, but before being bonded to the substrate, the films may be uniaxially stretched to achieve slit like pores which are permeable to air, but not water. This step is usually not necessary.

This invention will be more clearly understood by reference to the following examples, which are intended to be illustrative of the invention, but not limiting thereof.

EXAMPLE 1

A blend of about 400 grams polyvinylidene fluoride polymer (Pennwalt, Kynar 461), 600 grams triacetin (Kodak, Kodaflex) and about 600 grams of diacetin (Hallco, C-491, a mixture of about 49 percent glycerol diacetate, 24 percent glycerol monoacetate, 24 percent glycerol triacetate, and 3 percent glycerol by gas chromatographic analysis of a representative sample) is mixed at about 200° C. until homogeneous. The mixture is then extruded into hollow fibers, through an annular die at about 150° C. into a tank containing water at about 21° C. as the external coagulating agent. Tetraethylene glycol at about 150° C. is used as the core fluid. The fibers are drawn from the water quench bath at the rate of about 15 meters per minute (50 feet per minute), resulting in a residence time in the bath of about five seconds. The hollow fibers are leached in a water bath at about 22° C. overnight.

Fiber dimensions are approximately 590 microns internal diameter by 870 microns outer diameter. The hollow fibers are assembled into test units for evaluation. The hollow fibers possess a water permeation rate of between about 60–140 GFD at 10 psi. The fibers reject about 64 percent of a 0.1 percent feed solution of the globular protein gamma-globulin (7.5 nm nominal diameter). A scanning electron micrograph shows a cross-sectional morphology free of macrovoids.

EXAMPLE 2

Utilizing a RAM extruder, extrusion of a polyvinylidene fluoride-glycerol acetate mixture into hollow fibers is carried out. The mixture is composed of about 47.7 percent polyvinylidene fluoride polymer (Pennwalt, Kynar 461) and about 52.3 percent glycerol acetate solvent mixture (which contains about 25 percent triacetin (Kodak, Kodaflex) and about 75 percent diacetin (Hallco, C-491, a mixture of about 49 percent glycerol diacetate, 24 percent glycerol monoacetate, 24 percent glycerol triacetate, and 3 percent glycerol by gas chromatographic analysis of a representative sample). The hollow fiber extrusion temperature is about 225° C.; with a take-up speed of about 115 ft./min. Nitrogen gas is used as a core gas. The fibers produced appear to be transparent and stretchy. The hollow fibers are assembled into beaker units and leached with water on both sides. The tested fibers show a high permeability to water, with $K_{UF}$ values of about 175 ml/(m² hr cmHg) at room temperature and about 257 ml/(m² hr cmHg) at about 37° C. respectively. The hollow fibers also exhibit a rejection rate as high as about 98–99 percent for both blue dextran and albumin.

The hollow fibers of Examples 1 and 2 are prepared for evaluation as follows. Fibers are assembled, potted into beaker units (duplicate with 60 fibers per each) for leaching (both lumen and outside) with water.

The hollow fiber membranes produced are evaluated in a laboratory test apparatus to determine permeability to water. The beaker test apparatus consists of a closed beaker with four ports on the top of the beaker. A bundle of fibers is bent into a U-shape, and the ends of the fiber bundle are inserted into two of the ports on the top of the beaker unit. The ends of the fibers are potted into the ports using an epoxy resin.

Various modifications may be made in the present invention without departing from the spirit or scope thereof, and it is understood that we limit ourselves only as defined in the appended claims.

What is claimed is:

1. A microporous polyvinylidene fluoride polymer membrane useful in liquid separations comprising a microporous polyvinylidene fluoride polymer membrane containing at least one compound selected from the group consisting essentially of glycerol monoacetate, glycerol diacetate, glycerol triacetate, and mixtures thereof.

2. The semi-permeable polyvinylidene fluoride polymer membrane of claim 1 wherein the microporous polyvinylidene fluoride polymer membrane additionally contains glycerol.

3. The microporous polyvinylidene fluoride polymer membrane of claim 2 wherein the total amount of glycerol monoacetate, glycerol diacetate, glycerol triacetate, and/or glycerol contained in the membrane is less than about 75 weight percent.

4. A water impervious, air permeable material comprising an air permeable substrate to which is bonded on the outer surface thereof a water impervious, air permeable polyvinylidene fluoride film.

5. A composition useful for preparing a microporous polyvinylidene fluoride polymer membrane comprising a mixture of:
   A. at least one polyvinylidene fluoride polymer; and
   B. at least one solvent selected from the group consisting essentially of glycerol monoacetate, glycerol diacetate, glycerol triacetate, and mixtures thereof, in an amount itself sufficient to solubilize the polyvinylidene fluoride polymer at the membrane formation temperature;
wherein the polyvinylidene fluoride polymer and solvent are present in a ratio useful to form a microporous membrane useful for a liquid separation process.

6. The composition of claim 1 wherein the mixture further comprises a non-solvent glycerol, wherein the glycerol is present in an amount which does not deleteriously affect preparation of the membrane from the mixture.

7. The composition of claim 6 wherein the mixture has a sufficient viscosity to allow extruding, molding, or casting a microporous membrane at a temperature at which the mixture is homogeneous.

8. The composition of claim 7 wherein the mixture comprises by weight between about 10 and about 90 percent polyvinylidene fluoride polymer.

9. The composition of claim 8 wherein the polyvinylidene fluoride polymer is selected from the group consisting of polyvinylidene polymers, co-polymers, and mixtures thereof.

10. The composition of claim 9 wherein the polyvinylidene fluoride polymer membrane is useful for ultrafiltration or microfiltration or membrane stripping and has a porosity of between about 10 to about 90 percent.

11. The composition of claim 10 wherein the ultrafiltration membrane has an average pore size of about 20 to about 500 Angstroms and the microfiltration membrane has an average pore size of about 0.05 to about 10 microns.

12. The composition of claim 11 wherein the ultrafiltration membrane has a molecular weight cut-off of between about 500 and about 300,000.

13. The composition of claim 9 wherein the polyvinylidene fluoride polymer membrane is useful for dialysis and has a hydraulic permeability at 37° C. of at least about $$10 \frac{\text{milliliters}}{\text{hour meter}^2 \text{ cm Hg}}.$$

14. A process for preparing a microporous polyvinylidene fluoride polymer membrane comprising the steps of:
   A. forming a mixture comprising:
      i. at least one polyvinylidene fluoride polymer, and
      ii. at least one solvent selected from the group consisting essentially of glycerol monoacetate, glycerol diacetate, glycerol triacetate, and mixtures thereof, in an amount itself sufficient to solubilize the polyvinylidene fluoride polymer at the membrane formation temperature;
   B. heating the mixture to a temperature at which the mixture forms a homogeneous fluid and possesses sufficient viscosity to be extruded, molded, or cast into a microporous membrane;
   C. extruding, molding, or casting the viscous homogeneous fluid into a microporous membrane; and
   D. passing the membrane through one or more quench zones wherein the membrane gels and solidifies; wherein the microporous membrane so formed is useful for membrane liquid separation process.

15. The process of claim 14 wherein the mixture further comprises a non-solvent glycerol, wherein the glycerol is present in an amount which does not deleteriously affect preparation of the membrane from the mixture.

16. The process of claim 15 which further comprises the additional step of:
   E. simultaneously or consecutively passing the membrane through one or more leach zones in which at least a portion of the solvent and non-solvent is removed from the membrane.

17. The process of claim 16 which further comprises the additional step of:
   F. drawing the membrane before, during, or after leaching at a temperature at or above ambient temperature and below the melting point of the polyvinylidene fluoride polymer or the depressed melting point of the mixture to elongate the membrane and to induce orientation of the polyvinylidene fluoride polymer in the membrane.

18. The process of claim 17 which further comprises the additional step of:
   G. drying the membrane.

19. A method for the production of a microporous polyvinylidene fluoride polymer membrane which comprises:
   A. mixing at least one polyvinylidene fluoride polymer with at least one solvent selected from the group consisting essentially of glycerol monoacetate, glycerol diacetate, glycerol triacetate, and mixtures thereof, in a amount itself sufficient to solubilize the polyvinylidene fluoride polymer at the membrane formation temperature;
   B. heating the mixture to a temperature at which the mixture forms a homogeneous fluid and possesses sufficient viscosity to be formed into a membrane of a desired configuration;
   C. forming said homogeneous fluid into a membrane of a desired configuration; and
   D. passing the membrane through at least one gaseous quench zone under conditions such that the mixture cools and begins to phase separate while minimizing the loss of solvent(s) from the external surface of the membrane.

20. The method of claim 19 wherein said solvent is a mixture of glycerol monoacetate and glycerol diacetate.

21. The method of claim 19 wherein said polyvinylidene fluoride polymer comprises polyvinylidene fluoride and copolymers thereof.

22. The method of claim 19 wherein said solvent further includes glycerol mixed therewith.

23. The method of claim 19 wherein said solvent is present in amounts ranging from about 10 to 90 percent by weight relative to said polyvinylidene fluoride polymer.

24. The method of claim 19 which comprises the additional step of:
   E. passing the membrane through at least one liquid leach zone comprising a liquid in which the polyvinylidene fluoride polymer possesses low solubility, wherein at least a portion of the solvent(s) is removed from the membrane.

25. The method of claim 24 which comprises the additional step of:
   F. drawing the membrane at a temperature at or above ambient temperature and below the melting point of the polyvinylidene fluoride polymer or the depressed melting point of the mixture to elongate the membrane and to induce orientation of the polyvinylidene fluoride polymer in the membrane.

26. The method of claim 25 which comprises the additional step of:
   F'. annealing the membrane.

27. A method for the production of a hollow fiber microporous polyvinylidene fluoride polymer membrane which comprises:
   A. mixing at least one polyvinylidene fluoride polymer with at least one solvent selected from the group consisting essentially of glycerol monoacetate, glycerol diacetate, glycerol triacetate, and mixtures thereof, in an amount itself sufficient to solubilize the polyvinylidene fluoride polymer at the membrane formation temperature;
   B. heating the mixture to a temperature at which the mixture forms a homogeneous fluid and possesses a sufficient viscosity at extrusion conditions to permit extrusion of a hollow fiber membrane;
   C. extruding the mixture into a hollow fiber membrane using a core fluid; and
   D. passing the hollow fiber membrane through at least one gaseous quench zone under conditions such that the mixture cools and begins to phase separate while minimizing the loss of solvent(s) from the external surface of the hollow fiber membrane.

28. A method for the production of a sheet microporous polyvinylidene fluoride polymer membrane which comprises:
   A. mixing at least one polyvinylidene fluoride polymer with at least one solvent selected from the group consisting essentially of glycerol monoacetate, glycerol diacetate, glycerol triacetate, and mixtures thereof, in an amount itself sufficient to solubilize the polyvinylidene fluoride polymer at the membrane formation temperature;
   B. heating the mixture to a temperature at which the mixture forms a homogeneous fluid and possesses sufficient viscosity, at extrusion conditions to permit extrusion of a sheet membrane;
   C. extruding the mixture into a sheet membrane; and
   D. passing the sheet membrane through at least one gaseous quench zone under conditions such that the mixture cools and begins to phase separate while minimizing the loss of solvent(s) from the external surfaces of the sheet membrane.

* * * * *